United States Patent [19]
Holmes et al.

[11] Patent Number: 6,036,222
[45] Date of Patent: Mar. 14, 2000

[54] DRIVER AIR BAG MODULE

[75] Inventors: Francis Joseph Holmes, Beavercreek, Ohio; James Lloyd Webber, Shelby Township, Macomb County, Mich.

[73] Assignee: General Motors Corporation, Detroit, Mich.

[21] Appl. No.: 09/154,068

[22] Filed: Sep. 16, 1998

[51] Int. Cl.[7] ................................................ B60R 21/22
[52] U.S. Cl. .................... 280/728.2; 280/731; 280/736
[58] Field of Search ................................ 280/728.2, 731, 280/732, 736, 741, 728.1

[56] References Cited

U.S. PATENT DOCUMENTS

| | | | |
|---|---|---|---|
| 5,186,492 | 2/1993 | Wright et al. | 280/743 |
| 5,306,039 | 4/1994 | Nakayama | 280/728.2 |
| 5,797,622 | 8/1998 | Turner et al. | 280/731 |
| 5,851,027 | 12/1998 | DiGiacomo et al. | 280/736 |

*Primary Examiner*—Christopher P. Ellis
*Attorney, Agent, or Firm*—Kathryn A. Marra

[57] ABSTRACT

A driver air bag module is provided that is attachable to the steering wheel of an automotive vehicle and includes dual cylindrical inflators mounted to a base plate to which an air cushion enclosing cover is attached. The inflators are retained in recesses defined between an inflator retainer and the base plate which provide means for directing gas from the inflators into the air cushion. The assembly utilizes relatively inexpensive cylindrical inflators which may be operated together for maximum pressure inflation of the air cushion or singly for a lesser pressure inflation where operation of the air cushion at a lower pressure is desired.

6 Claims, 2 Drawing Sheets

DRIVER AIR BAG MODULE

TECHNICAL FIELD

This invention relates to vehicle air bags or inflatable restraints and more particularly to a driver air bag module for installation in the steering wheel of an automotive vehicle.

BACKGROUND OF THE INVENTION

The use of air bags, sometimes called supplemental inflatable restraints or inflatable air cushions, mounted in the steering wheels of automotive vehicles is well known. Recently interest has developed in so called "smart air bags" which may be controlled in various ways to modify operation under certain conditions.

SUMMARY OF THE INVENTION

The present invention provides an improved driver air bag module for mounting in the steering wheel of an automotive vehicle. The module mounts dual cylindrical inflators which may be actuated individually or together to provide differing levels of gas pressure for inflating the air bag. The dual inflators operated together provide sufficient gas pressure for conventional operation of an air bag and are used in place of a single inflator. Operation of a single one of the inflators provides gas at a lower pressure which may be suitable for use under certain predetermined impact and occupant conditions.

The dual cylindrical inflators are mounted between a base plate and an inflator retainer fixed to the base plate to define cylindrical recesses for receiving the inflators. Transfer openings in the base plate and passages in the inflator retainer direct gas from the inflators toward an air bag mounted in a cover on the outer side of the base plate. A cushion retainer for the air bag is secured to the base plate by fasteners which also connect with the inflator retainer to form an assembly. Attachment lugs are mounted on the ends of some of the fasteners for attaching the module to a steering wheel.

A resilient cover encloses an inflatable air cushion and includes resilient fingers having inwardly extending lugs that engage slots in the base plate upon assembly. After installation in a steering wheel, the resilient fingers are outwardly engaged by a retaining ring that prevents removal of the cover while the module is in place.

These and other features and advantages of the invention will be more fully understood from the following description of certain specific embodiments of the invention taken together with the accompanying drawings.

DESCRIPTION OF THE PREFERRED EMBODIMENT

Figure 1:
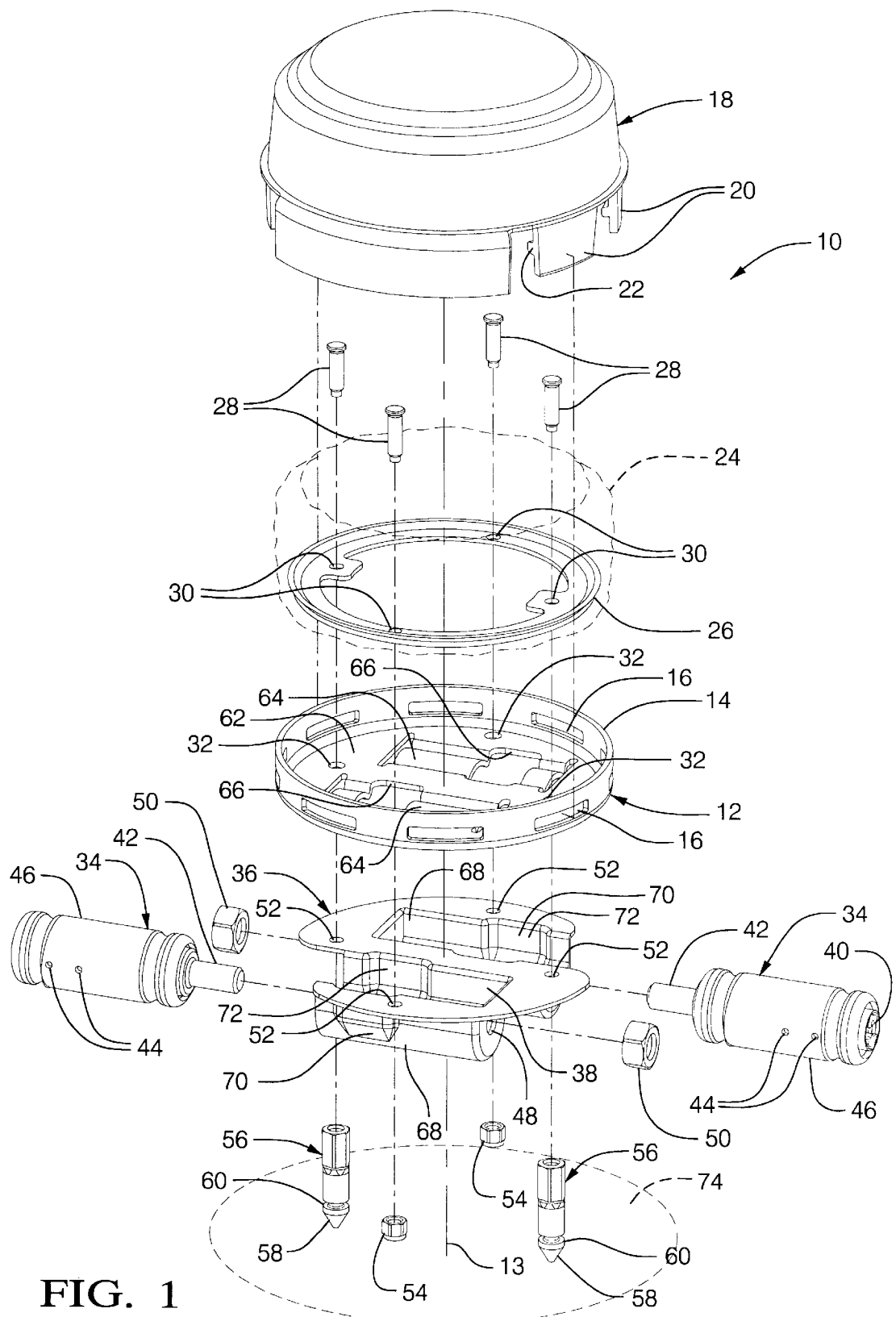
FIG. 1 is an exploded pictoral view of a module according to the invention showing outer sides of the components.
Figure 2:
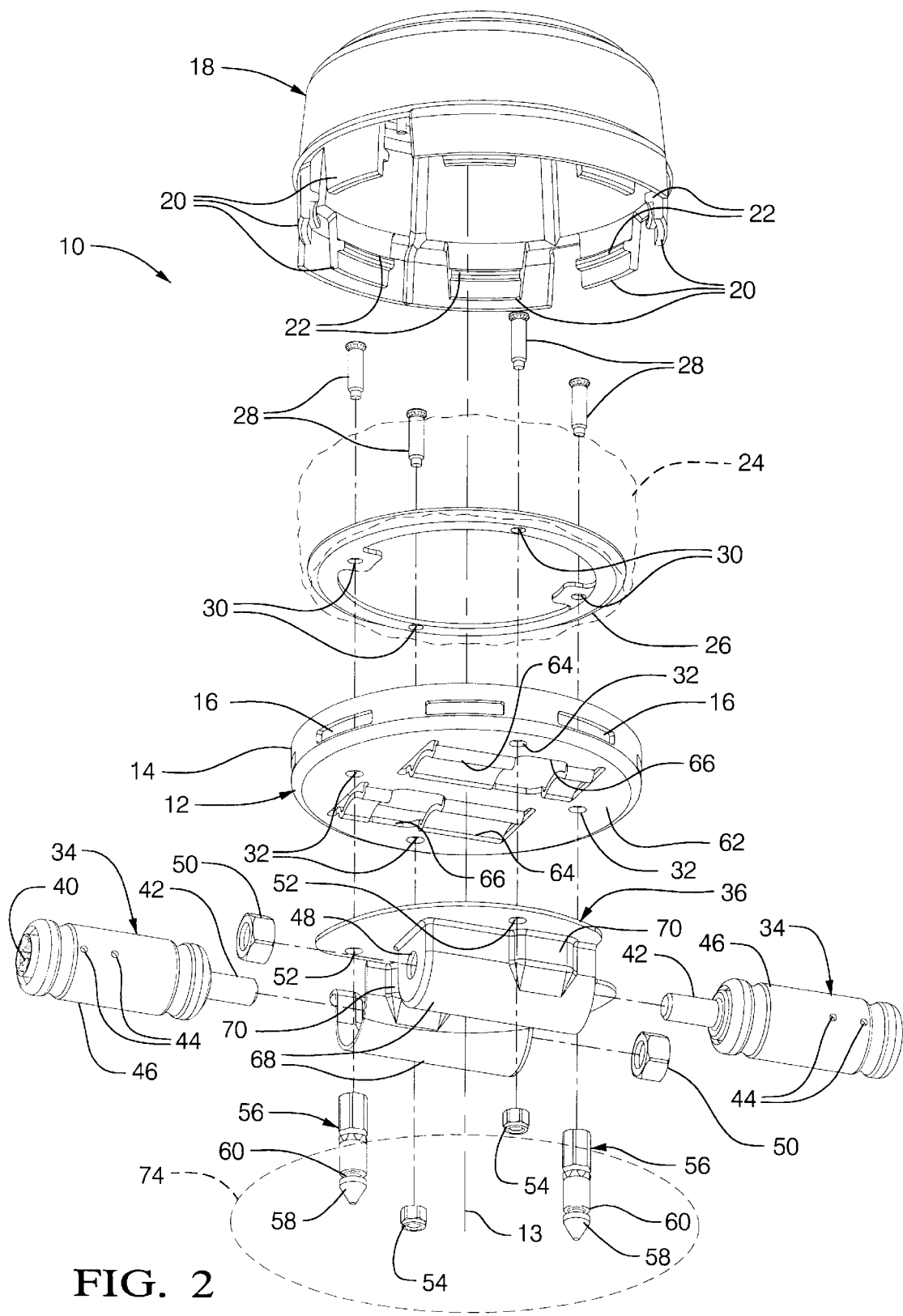
FIG. 2 is and exploded pictoral view of the assembly of FIG. 1 showing inner sides of the components.

Referring now to the drawings in detail, numeral 10 generally indicates a driver air bag module in accordance with the invention. Module 10 comprises an assembly including a circular base plate 12 having a central axis 13 and an axially outwardly (upwardly) extending rim 14 with a plurality of annularly spaced slots 16 extending through the rim 14 around its periphery. A molded cover 18, formed with a circular dome-like shape, includes a plurality of downwardly extending annularly spaced resilient fingers 20 having radially inwardly extending lugs 22 that are engageable with the slots 16 of the base plate 12. Assembly of the cover 18 to the base plate 12 is accomplished by bending the resilient fingers 20 outward as the cover 18 is pushed over the base plate 12 until the lugs 22 engage the slots 16, retaining the cover 18 in place. A conventional inflatable air cushion 24, shown schematically, is received in a storage compartment formed between the base plate 12 and the cover 18 within its dome-shaped interior. The air cushion 24 is attached to the base plate 12 by a cushion retainer 26 secured to the base by four fasteners 28 which extend through openings 30 in the cushion retainer 26 and aligned openings 32 in the base plate 12.

A pair of cylindrical inflators 34 are mounted on the outer side of the base plate 12 and are retained thereon by an inflator retainer 36 which, together with the base plate 12, defines a pair of generally cylindrical and oppositely facing open ended recesses 38 in which the cylindrical inflators 34 are received. The cylindrical inflators 34 are a type known for typical side air bag applications and include electrical connections or sockets 40 on outer ends thereof and axially extending retaining studs 42 on inner ends thereof. Gas discharge openings 44 are provided near the outer ends through the cylindrical housings 46 of the inflators 34. A pair of axially spaced openings 44 on one side of each inflator 34 are paired with an identical pair of axially spaced openings, not shown, on the other side of the inflator 34, as it is conventional practice in some inflator types to balance the positions of the outlet openings 44 so that the discharge of gas from an inflator 34 will be balanced by equal forces in opposite directions giving a neutral force on the inflators 34 themselves. The inflators 34 are slid into the cylindrical recesses 38 from their inner ends with the retaining studs 42 extending through retaining openings 48 in the inner end walls of the recess-defining inflator retainer 36. Nuts 50 threadably engage the studs 42 to hold the inflators 34 in their recesses 38.

Fasteners 28 extend through openings 52 in the inflator retainer 36 so as to hold inflator retainer 36 to the base plate 12 along with the cushion retainer 26. A pair of nuts 54 engage two of the fasteners 28 to maintain the parts in assembly while the other two fasteners 28 are engaged by the internally threaded ends of attachments studs 56. The threaded ends of studs 56 assist in retaining the parts in assembly while the outwardly extending opposite ends have conical ends 58 with inwardly adjacent grooves 60 which are provided for attaching the assembled module 10 to a steering wheel, not shown.

A central portion 62 of the base 12 includes raised portions 64 that cooperate with the inflator retainer 36 to define the cylindrical recesses 38 in which the inflators 34 are received. Transfer openings 66 are provided, one in each of the raised portions 64, through the central portion 62 of the base plate 12 for allowing gas discharged from the inflators 34 to pass from the recesses 38 through the base plate 12 and within the cushion retainer 26 into the inflatable air cushion 24. The cooperating recess defining portions 68 of the inflator retainer 36 include outwardly flared sides 70 which form transfer passages 72 positioned to conduct gas discharge from both sides of the cylindrical wall of each of the inflators 34 from their discharge openings 44 through the transfer openings 66 to the air cushion 24.

When the assembled module 10 is installed upon the steering wheel of an associated vehicle, a retaining ring 74, shown in phantom in the drawings, is positioned to surround the resilient fingers 20, holding them in against the side of the base plate 12 so that the lugs 22 cannot be detached from the base plate 12 while the module 10 is secured to the steering wheel. In this way the cover 18 is prevented from loosening from the assembly upon deployment of the air cushion 24 which allows a weakened section, not shown, of the cover 18 to open in conventional manner and allow the air cushion 24 to expand outwardly to protect the driver of the vehicle.

In operation, the inflators 34 may be of the gas generating type shown or of other types filled with compressed gas or combinations thereof. Suitable controls, not part of the present invention, may be provided to actuate the inflators 34 as desired. For example, discharge of gas from both inflators 34 at the same time could be arranged to provide the rate of inflation of the air cushion 24 desired for normal operation of the air bag module 10. If operation at a lesser operating pressure is desired, the controls could be arranged to actuate only one of the inflators 34 which could be set to discharge the desired lesser amount of gas pressure so as to provide a suitable of pressure for inflation of the air bag at a rate considered appropriate for the particular circumstances. Thus an arrangement is provided for a simple and relatively low cost driver air bag module 10 which uses dual cylindrical inflators to provide the capability of operation at two or more differing gas pressure and timing conditions as may be desired under various operating conditions of the vehicle.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

We claim:

1. A driver air bag module for an automotive vehicle, said module comprising:

a base plate mountable to a steering wheel of a vehicle;

a cover mounted on said base plate and enclosing a storage compartment;

an inflatable air cushion stored in said compartment between the cover and the base plate; and a pair of cylindrical inflators mounted to the base plate and operable to discharge cushion inflating gas into the air cushion, and an inflator retainer fixed to said base plate and defining therewith a pair of generally cylindrical recesses for receiving said cylindrical inflators, said recesses including transfer openings communicating with said air cushion for directing said cushion inflating gas into said air cushion.

2. An air bag module as in claim 1 wherein said inflators include cylindrical housings having gas discharge openings on opposite sides thereof and said transfer openings connect with transfer passages that direct gas from the opposite sides of the inflator housings through said transfer openings to said air cushion.

3. An air bag module as in claim 2 and including retaining studs on said inflators and extending through retaining openings in one end of each of the cylindrical recesses, and fasteners engaging the retaining studs to hold the inflators in said cylindrical recesses.

4. An air bag module as in claim 1 wherein said cover includes annularly spaced resilient fingers having inwardly extending lugs engaging slots in said base plate for mounting of the cover to the base.

5. An air bag module as in claim 1 and including:

an inflator retainer and a cushion retainer fixed to opposite sides of said base plate by retaining means;

said inflator retainer defining with the base plate a pair of cylindrical recesses receiving the cylindrical inflators, the cylindrical recesses including transfer openings communicating the inflators with the inflatable air cushion for inflating the cushion; and attachment studs connected with the retaining means for attaching the module to a steering wheel.

6. An air bag module as in claim 5 wherein said steering wheel includes a retaining ring outwardly engagable with resilient fingers extending from the cover to maintain lugs of the fingers in engagement with slots in the base plate after attachment of the module to the steering wheel.

* * * * *